United States Patent [19]

Fromm

[11] Patent Number: 4,763,703
[45] Date of Patent: Aug. 16, 1988

[54] APPARATUS FOR CUTTING MITERS ON TRIM MEMBERS

[76] Inventor: Ferdinand Fromm, Endersbacher Str. 16B, D-7000 Stuttgart 50, Fed. Rep. of Germany

[21] Appl. No.: 19,106

[22] Filed: Feb. 26, 1987

[30] Foreign Application Priority Data

Mar. 4, 1986 [DE] Fed. Rep. of Germany ....... 3606995

[51] Int. Cl.$^4$ ................................................. B27G 5/00
[52] U.S. Cl. ...................................... 144/216; 83/473; 83/477.1; 144/2 R; 144/379
[58] Field of Search ............... 144/2 R, 3 R, 216, 353, 144/355, 379; 83/473, 477.1; 269/905

[56] References Cited

U.S. PATENT DOCUMENTS 3,342,227  9/1967  Zern ..................................... 83/473
4,592,401  6/1986  Vanago ............................... 144/216

FOREIGN PATENT DOCUMENTS 1695544  3/1955  Fed. Rep. of Germany .

Primary Examiner—W. Donald Bray
Attorney, Agent, or Firm—Peter K. Kontler

[57] ABSTRACT

Apparatus for cutting miters on two side trim members which are bonded to the respective portions of the edge face of a panel (such as a table top), and on a head trim member which is to be bonded to the portion of the edge face of the panel between the side trim members has a first support for the panel with one or more abutments for the panel and one side trim member, and a mobile abutment which is reciprocable along the portion of the edge face between the side trim members to cause the generation of a signal when it reaches the other side trim member. The signals are used to stop the motor for adjustment of one of two mirror symmetrical sawing machines which are used to sever the trim members by moving their blades at right angles to the plane of the panel. The head trim member is mounted in a clamping device which carries adjustable stops and adjustable jaws for engagement with spaced-apart portions of the head trim member at a level above or below the panel.

20 Claims, 5 Drawing Sheets

APPARATUS FOR CUTTING MITERS ON TRIM MEMBERS

BACKGROUND OF THE INVENTION

The invention relates to improvements in methods and apparatus for cutting miters on trim members. More particularly, the invention relates to improvements in apparatus which can be used with particular advantage for simultaneously or practically simultaneously cutting miters on three trim members including two side trim members which are temporarily or permanently secured to a support, such as a panel constituting or forming part of a table top. Still more particularly, the invention relates to improvements in apparatus of the type wherein two sawing machines are movable jointly relative to a set of aligned trim members to cut miters at selected angles while advancing relative to the supporting means for the trim members.

It is known to provide the edge faces of certain types of panels, such as table tops, door panels and the like, with trim members which are normally bonded to the panels and whose meeting end portions are provided with miter cuts extending diagonally of the panels. Problems arise when the last of a set of three or more trim members is to be cut to size so as to fit exactly into the space between the neighboring end portions of the trim members which are adjacent thereto. As a rule, the previously applied trim members are called side trim members and the trim member which is to be inserted between the side trim members is called a head trim member. Reference may be had, for example, to U.S. Pat. No. 3,342,227 granted September 19, 1967 to Zern. Heretofore known proposals for cutting head trim members to exact size are not entirely satisfactory because such members are either too long (so that they do not accurately overlie the respective portion of the edge face of the panel) or too short so that they and the neighboring side trim members define unsightly clearances at the respective corners of the panel.

German Utility Model No. 16 95 544 discloses an apparatus for cutting miters on trim members wherein both ends of the head trim member can be cut simultaneously with the adjacent ends of two neighboring side trim members. A drawback of the proposal which is disclosed in this publication is that the quality of the work (i.e., the exact length of the head trim member) depends largely or exclusively on the skill and carefulness of the operator and that the operation is too slow.

The aforementioned U.S. Pat. No. 3,342,227 to Zern discloses a more sophisticated trim cutting apparatus which is designed to apply trim members to door and window frames and door panels. A drawback of the proposal of Zern is that the apparatus is very complex and expensive even though it can perform the miter cutting operation with a reasonably high degree of accuracy.

OBJECTS AND SUMMARY OF THE INVENTION

An object of the invention is to provide a relatively simple and compact but reliable and versatile miter cutting apparatus whose operation can be automated to a desired extent and which can be adjusted to cut miters on trim members for use on square, rectangular or other polygonal panels.

Another object of the invention is to provide a novel and improved method of miter cutting a head trim member and one or more side trim members.

A further object of the invention is to provide an apparatus which can automatically straighten out curved or otherwise deformed trim members.

An additional object of the invention is to provide novel and improved means for moving one or more sawing machines in the above outlined apparatus.

The invention is embodied in an apparatus for cutting miters on adjacent side and head trim members. The apparatus comprises first supporting means (such as a horizontal table and a panel thereon) for supporting two mutually inclined side trim members in a first plane, at least one (preferably adjustable) first abutment for one of the side trim members, at least one mobile second abutment for the other of the side trim members, and means (e.g., a carriage) for moving the second abutment relative to the first abutment and relative to one side trim member along a predetermined path so as to engage a selected portion (particularly a projecting end portion) of the other side trim member. The apparatus further comprises second supporting means (such as a clamping device) for supporting a head trim member in a second plane parallel to the first plane and at a level other than the level of the first plane so that the head trim member on the second supporting means extends across the ends of the side trim members and at predetermined angles (e.g., 45°) thereto. The second supporting means includes a plurality of adjustable means (e.g., jaws mounted on rotary spindles and cooperating with fixedly mounted or adjustable abutments) for locating the head trim member in a predetermined orientation relative to the side trim members on the first supporting means. The apparatus further comprises first and second sawing machines having mutually inclined plane cutting tools (e.g., rotary circular saw blades) disposed at predetermined angles to the trim members on the first and second supporting means, conveyor means for moving the sawing machines substantially at right angles to the first and second planes so that each of the sawing machines severs the head trim member and one of the side trim members, and means for adjusting at least one of the sawing machines with reference to the supporting means and the trim members thereon.

As mentioned above, the first supporting means can comprise a table and a panel on the table. The panel has an edge face including spaced-apart mutually inclined first and second portions each adjacent one of the side trim members, and a third portion disposed between the first and second portions and parallel to the head trim member which is held by the second supporting means. The third portion of the edge face is inclined with reference to the first and second portions and the table preferably carries at least one third abutment or stop for the edge face of the panel. The second abutment is movable with reference to the table in parallelism with the third portion of the edge face, and the adjusting means for at least one of the sawing machines preferably includes means for moving the one machine (preferably jointly with the mobile second abutment) in parallelism with the third portion of the edge face of the panel on the table i.e., in parallelism with the path of movement of the second abutment toward and away from the other side trim member on the panel.

The adjusting means can further comprise suitable means for changing the inclination of at least one of the tools relative to the other tool. The locating means can comprise means for locating the head trim member on the second supporting means at a distance from the third portion of the edge face of the panel which is a function of the thickness of the plane tools and/or of the inclination of the tools relative to each other and/or the inclination of the third portion of the edge face of the panel relative to the first and second portions of the edge face. The adjusting means is preferably arranged to place each of the two tools into register with a different one of two edges which are defined by the third portion of the edge face with the first and second portions at the respective corners of the panel.

Means can be provided for generating signals in response to adjustment of the one machine when the respective tool is in accurate register with the adjacent edge. The signal generating means can include or cooperate with the second abutment and can be arranged to generate optical, acoustic, electric and/or other signals. The adjusting means can comprise manually actuatable means for moving the one sawing machine and/or a motor whose operation can be controlled by signals which are generated by the aforementioned signal generating means when the tool of the adjustable sawing machine registers with the respective edge i.e., when the second abutment reaches the desired position with reference to the other side trim member.

The signal generating means can comprise a microswitch which is actuated by the second abutment when the latter contacts the selected portion of the other side trim member. The second abutment can comprise a knife edge which is arranged to move along the third portion of the edge face of the panel.

The adjusting means for the one sawing machine can comprise a carriage, guide means (e.g., one or more elongated tie rods or analogous guide members between two spaced-apart platens) supporting the carriage for movement in parallelism with the first and second planes, and the aforementioned motor for moving the carriage along the guide means. The motor can include or can be arranged to drive a rotary feed screw.

The conveyor means for the one sawing machine can comprise a slide which is movably mounted on the carriage or on a substantially plate-like holder of the carriage, and means (e.g., a reciprocable cylinder and piston unit) for moving the slide relative to the carriage along a path extending at right angles to the first and second planes. The carriage can comprise or support two elongated guide members (e.g., rods or rails) and the slide is reciprocable along such guide members. The conveyor means can further comprise a plate-like holder for the other sawing machine and a slide provided on the holder and supporting the other machine.

The locating means can comprise at least two stops which are provided on the second supporting means and a jaw for each stop. The jaws are mounted on the second supporting means for movement toward and away from the respective stops so as to clamp the head trim member between them. The second supporting means can further comprise brackets or otherwise configurated supporting elements for movably carrying the jaws. The supporting elements can be provided with supporting surfaces for the head trim member.

If the panel and/or the head trim member is large (e.g., if the head trim member is relatively long and is likely to bend and/or to undergo other form of deformation if not adequately supported at a reasonably large number of locations), the locating means can comprise at least three stops including first and second stops respectively located adjacent the first and second portions of the edge face of the panel, and at least one additional stop between the first and second stops. A discrete supporting element can be provided on the second supporting means for each stop of the locating means, and the jaws which cooperate with the stops are movably mounted on the respective supporting elements. Means can be provided for separably affixing or coupling each additional stop to the second supporting means and/or to the aforementioned tie rods for the carriage. As mentioned above, signals which are generated by the signal generating means (such as a microswitch) in response to advancement of the second abutment into engagement with the respective side trim member can be used to operate the adjusting means for the one and/or the other sawing machine.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
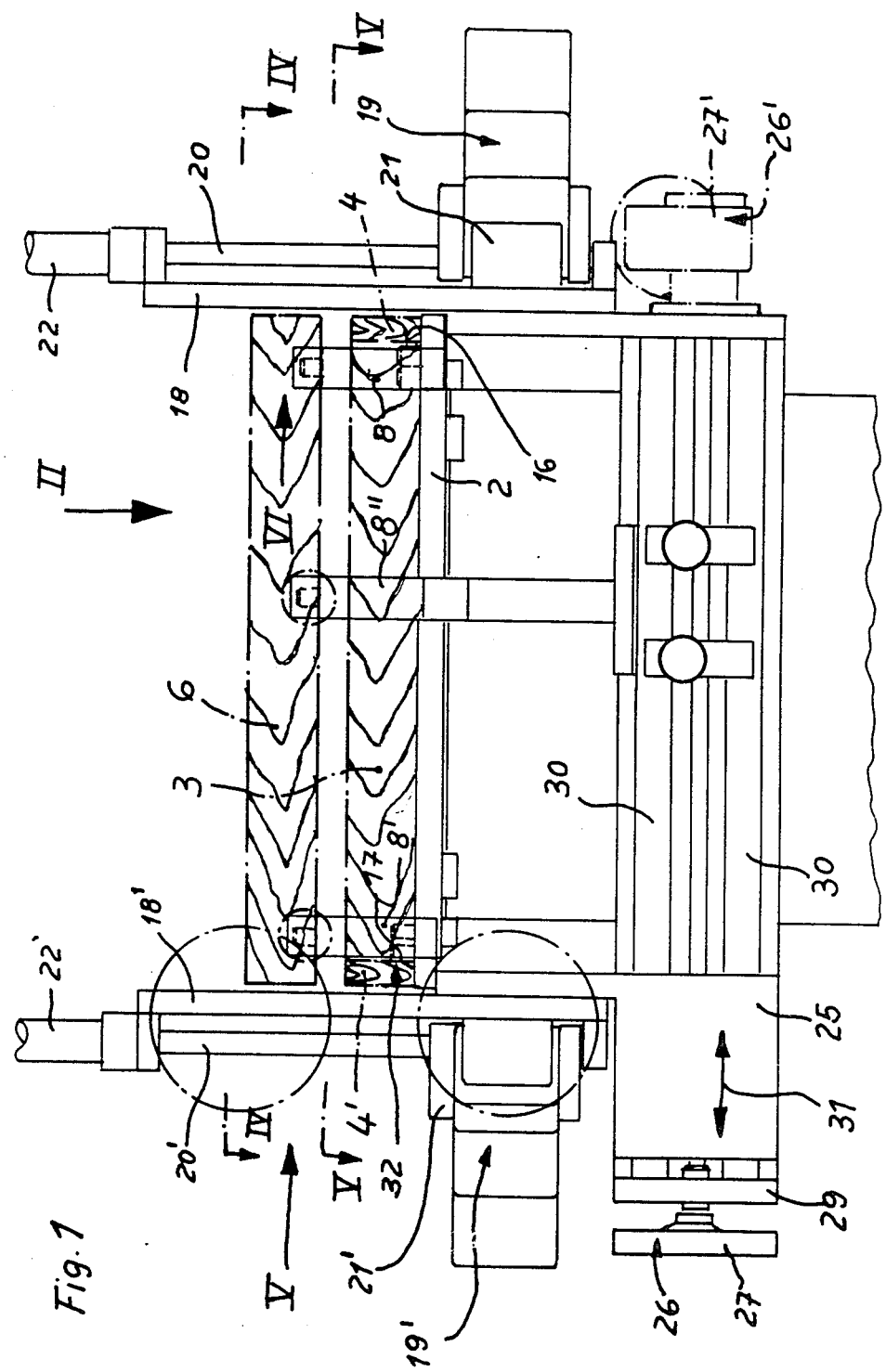
FIG. 1 is a schematic elevational view of an apparatus which embodies the invention.
Figure 2:
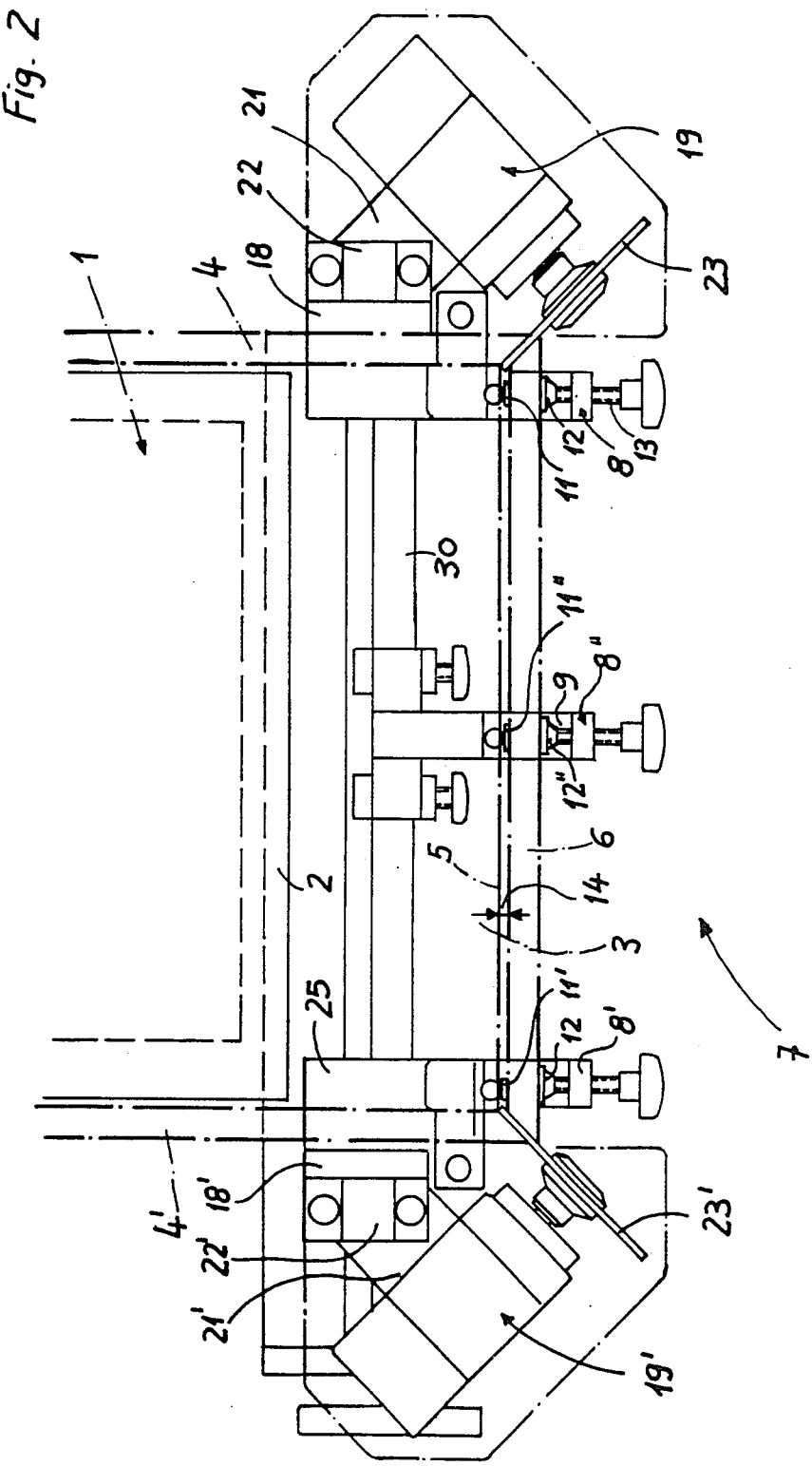
FIG. 2 is a fragmentary plan view of the apparatus as seen in the direction of arrow II in FIG. 1.

Referring first to FIGS. 1 and 2, there is shown an apparatus for cutting miters on two parallel side trim members 4, 4' simultaneously or substantially simultaneously with the cutting of miters on a head trim member 6. The apparatus comprises first supporting means including a horizontal table 2 which is installed in a frame or housing 1, and a panel 3 which is supported by the table 2 and has an edge face 5 in contact with abutments 15 and 15' (FIG. 3) of the table 2. The panel 3 is or can be made of wood and its edge face 5 has parallel first and second portions 5a, 5b which are in contact with the respective side trim members 4, 4' as well as a third portion 5c which makes with the first and second portions 5a, 5b an angle of 90° and is disposed between them. The abutments 15 and 15a contact the third portion 5c of the edge face 5. The side trim members 4 and 4' are adhesively secured or nailed to the respective portions 5a and 5b of the edge face 5. The front end portions of the side trim members 4 and 4' extend forwardly beyond the third portion 5c of the edge face 5 and are to be cut by the plane rotary tools (rotary saw blades) 23, 23' of two discrete sawing machines 19 and 19'. The severing of projecting front end portions of the side trim members 4, 4' takes place simultaneously or practically simultaneously (in a single operation) with severing of the respective end portions of the head trim member 6.

The head trim member 6 is releasably and adjustable held in a second supporting means 7 (hereinafter called clamping device) which is mounted in or on the frame 1 in such a way that the plane of the trim member 6 is located at a level above or below the level of the plane of the table 2, panel 3 and side trim members 4, 4'. This can be seen in FIG. 2 wherein the head trim member 6 is disposed at a level above the level of the side trim members 4, 4' and extends at right angles to the side trim members in such a way that its end portions cross at right angles the front end portions of the side trim members.

Figure 4:
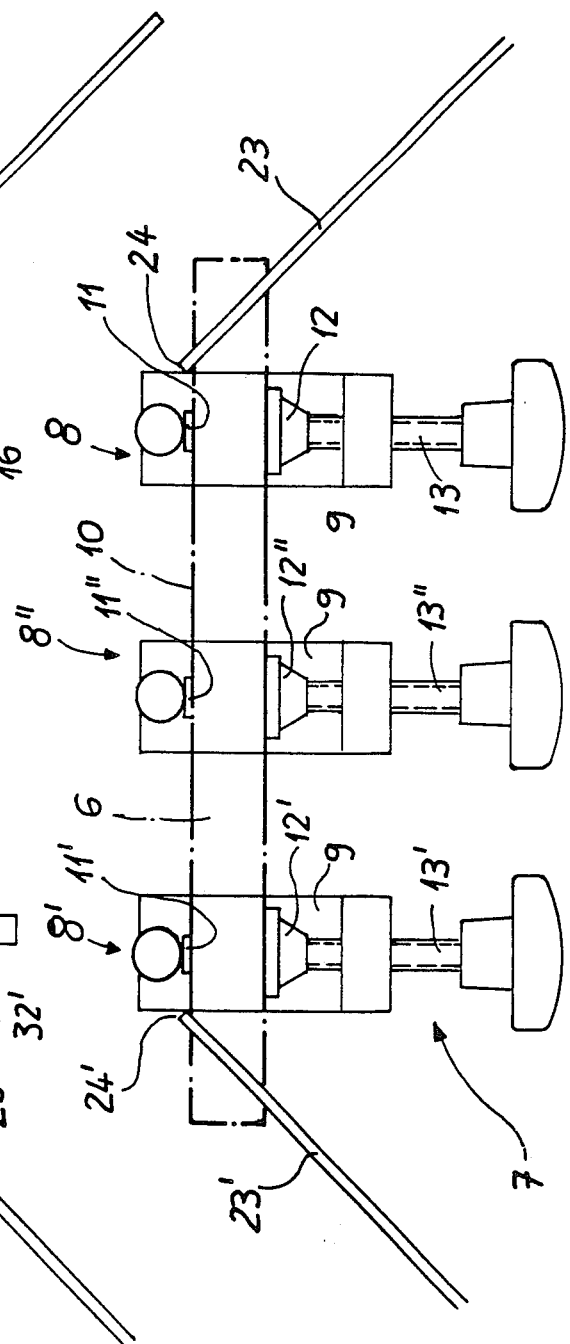
FIG. 4 is a similar enlarged view of certain other details in the structure of FIG. 2 as seen in the direction of arrows from the line IV—IV in FIG. 1.

The clamping device 7 comprises at least two supporting elements 8, 8' in the form of brackets which are mounted on the frame 1 and are respectively adjacent the front end portions of the side trim members 4 and 4' on the panel 3. The brackets 8 and 8' extend upwardly across and beyond the plane of the table 2 and panel 3 and are provided with platforms defining supporting surfaces 9 for the head trim member 6. The surfaces 9 are best shown in FIG. 4. That surface of the head trim member 6 which is to be bonded to the third portion 5c of the edge face 5 of the panel 3 is denoted by the reference character 10. The surface 10 is in contact with locating means in the form of abutments 11 and 11' which are respectively provided on the brackets 8 and 8'. These brackets further carry jaws 12 and 12' which are mounted on manually rotatable threaded clamping spindles 13 and 13' so as to be movable toward and away from the respective abutments 11 and 11' whereby a properly mounted head trim member 6 rests on the surfaces 9 and is simultaneously clamped between the abutments 11, 11' and the respective jaws 12, 12'.

The clamping device 7 can further comprise one or more additional supporting elements or brackets with platforms, locating means or abutments and jaws on threaded clamping spindles. Such additional bracket or brackets are desirable or necessary if the panel 3 is large, i.e., if the head trim member 6 is rather long and is likely to flex or undergo other deformation if it is held only at two spaced-apart locations (i.e., between the abutment 11 and the jaw 12 on the one hand, and between the abutment 11' and the jaw 12' on the other hand). FIGS. 1, 2 and 4 show a single additional bracket 8" which can but need not be disposed exactly or substantially midway between the brackets 8, 8' and is provided with a platform having a supporting surface 9 for the head trim member 6, a locating means or abutment 11" and a jaw 12" mounted at the forward end of a spindle 13" which is rotatable by a knob so as to move the jaw 12" nearer to or further away from the respective abutment 11".

The abutments 11, 11' and 11" are preferably adjustable on the respective brackets 8, 8' and 8" in directions toward and away from the third portion 5c of the edge face 5 of the panel 3 which lies on the table 2 so as to place the vertical plane of the surface 10 of the head trim member 6 at an optimum distance from the vertical plane of the third portion 5c of the edge face 5 of the panel 3. The illustrated distance 14 between such vertical planes is a function of the thickness of the rotary tools 23, 23' which respectively form part of the sawing machines 19 and 19'. The distance 14 is further a function of the inclination (miter angle) of the planes of the tools 23, 23' relative to the third portion of the edge face 5.

Figure 3:
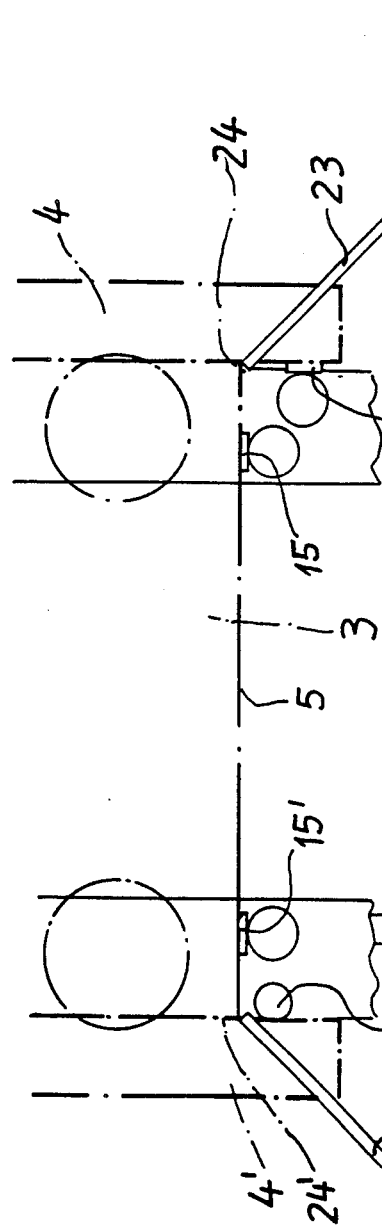
FIG. 3 is an enlarged view of certain details in the structure of FIG. 2.

The abutments 15 and 15' for the panel 3 are preferably adjustable with reference to the frame 1 and table 2. The table 2 further supports an abutment 16 which is preferably adjustable and is in contact with the inner side of the trim member 4 at a location forwardly of the third portion 5c of the edge face 5. FIG. 3 shows that the abutment 16 contacts that end portion of the side trim member 4 which is separated from the main portion of the member 4 when the sawing machine 19 is caused to perform a working stroke by moving along a path which extends at right angles to the plane of the panel 3 on the table 2. Still further, the apparatus comprises an adjustable follow-up abutment 17 which is movable in parallelism with the third portion 5c of the edge face 5 into contact with the inner side of that (front) portion of the side trim member 4' which is to be cut away by the tool 23' of the sawing machine 19' when the latter is caused to perform a working stroke in a direction at right angles to the plane of the panel 3. The abutment 17 cooperates with a microswitch 32 forming part of a monitoring device which serves to generate an electric signal when the abutment 17 reaches the trim member 4'. The monitoring device can further generate an optical and/or acoustical signal to inform the attendant or attendants that the abutment 17 has reached the side trim member 4'. Electric or other signals which are generated by the monitoring device including the microswitch 32 are or can be used to control the operation of the apparatus in a manner to be described below.

The means for adjustably mounting the abutments 11, 11', 11", 15, 15', 16 and/or 17 on their respective supporting elements or supporting means can include pin-and-slot connections and screws or bolts and nuts for fixing the adjusted abutments in the newly selected positions. The abutment 17 can have a portion which resembles or constitutes a knife edge and is movable along the portion 5c of the edge 5 of the panel 3.

Figure 5:
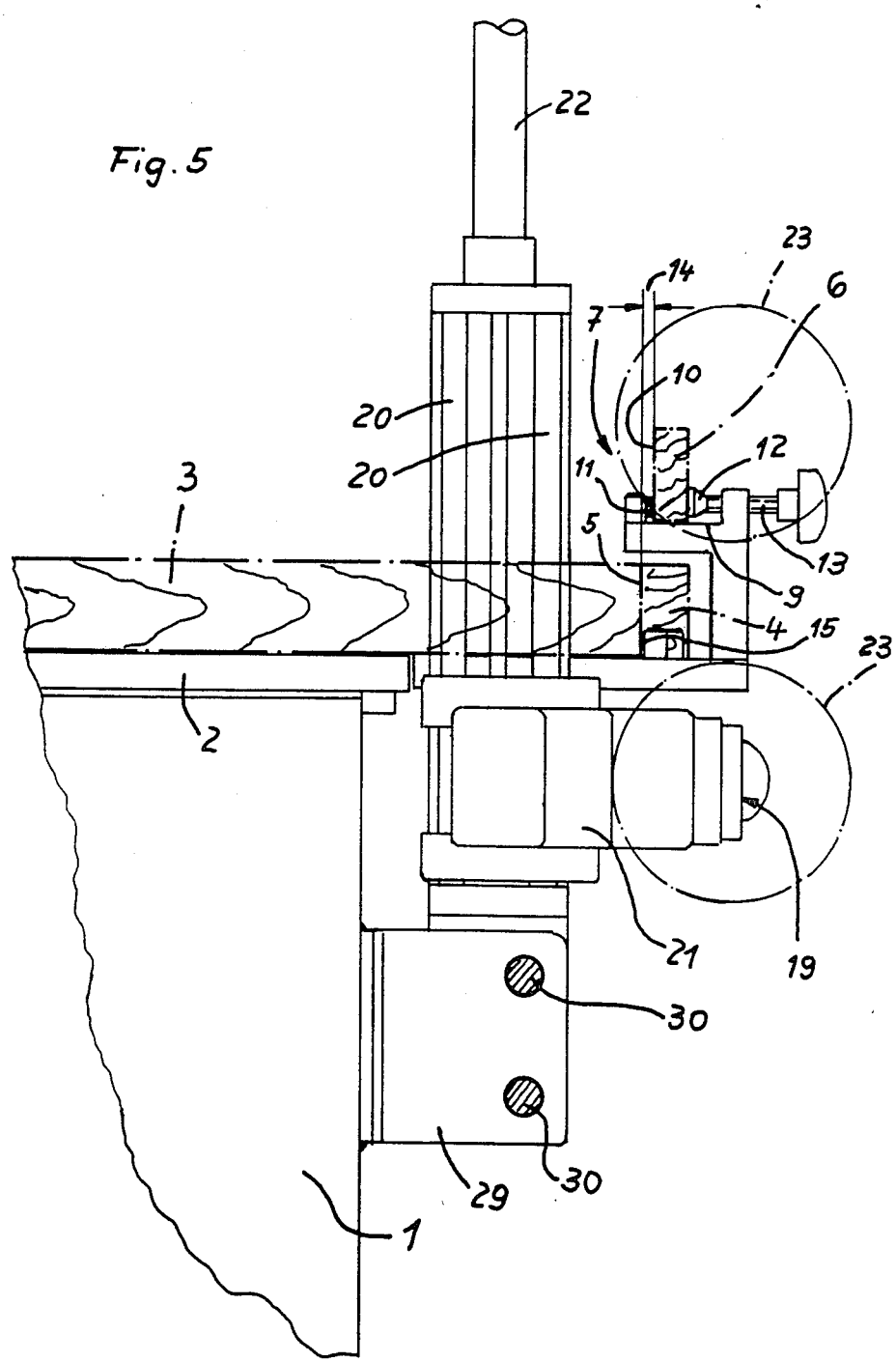
FIG. 5 is an enlarged view of a detail in the right-hand portion of FIG. 1 as seen in the direction of arrows from the line V—V.

The sawing machine 19 is mounted on a plate-like holder 18 at one side of the frame 1, namely outwardly adjacent the side trim member 4 on the panel 3. The holder 18 is provided with two parallel vertical guide members 20 for a slide 21 which actually mounts the sawing machine 19 and is movable up and down by a vertical elevator conveyor 22, e.g., a fluid-operated cylinder and piston unit, a motor-operated rack and pinion drive, a motor-operated belt and pulley or endless chain transmission or any other suitable means for moving the sawing machine 19 along a vertical path at right angles to the plane of the panel 3 on the table 2. The sawing machine 19' is mounted in similar fashion on a slide 21' which is reciprocable by a conveyor 22' along guide members 20' on a plate-like holder 18'. The upper and lower end positions of the rotary tool 23' of the sawing machine 19' are shown in FIG. 1 by two phantom-line circles and the upper and lower end positions of the rotary tool 23 of the machine 19 are shown in FIG. 5, again by two phantom-line circles.

FIGS. 2, 3 and 4 show the selected inclination of the tools 23 and 23' with reference to the third portion 5c of the edge face 5 of the table 3. Thus, the planes of these tools make an angle of 90° with each other and they make angles of 45° with the plane of the portion 5c. This is due to the fact because the trim members 4, 6 and 4' are respectively disposed at right angles to each other (the panel 3 is a rectangular or square body). The height of the trim members 4, 4' and 6 (as measured at right angles to the plane of FIG. 3) is preferably the same. The angle between the plane of the tool 23 or 23' and the third portion 5c of the edge face 5 of the panel 3 will deviate from 45° if the thickness of the side trim members 4, 4' (as measured at right angles to the plane of the portion 5c) deviates from the thickness of the head trim member 6 and/or if the outline of the panel 3 is a polygon other than a square or a rectangle.

The vertical edge 24 at the corner between the portions 5a and 5c of the edge face 5 is in line with the foremost portion of the tool 23, and the vertical edge 24' at the corner between the portions 5b and 5c of the edge face 5 is in line with the foremost portion of the tool 23'. This can be seen in FIGS. 3 and 4. Such positioning of the tools 23 and 23' is possible by properly selecting the position of the panel 3 on the table 2, by properly selecting the position of the head trim member 6 in the clamping device 7 and/or by properly selecting the position of at least one of the sawing machines 19 and 19' relative to the respective holder 18 or 18'.

In the illustrated apparatus, the plate-like holder 18' for the slide 21' which carries the sawing machine 19' is mounted on a carriage 25 which is reciprocable (note the double-headed arrow 31) in parallelism with the portion 5c of the edge face 5 of the panel 3 along horizontal guide members 30 in the form of tie rods whose end portions are secured to platens 29 and 29'. The drive means 26 (FIG. 1) for moving the slide 25 along the tie rods 30 (i.e., for moving the sawing machine 19' toward or away from the sawing machine 19) includes a feed screw 28 which is rotatable by a hand wheel 27. Alternatively, or in addition to the hand wheel 27, the means for rotating the feed screw 28 can comprise a second drive 26' having a servomotor 27' whose output element can drive the feed screw 27 in a clockwise or in a counterclockwise direction. The feed screw 27 can be replaced with a belt or chain transmission, with a rack and pinion drive, with a cable or cord and pulley transmission or with any other suitable lightweight means for moving the carriage 25 along the tie rods 30 to any one of a practically infinite number of different positions. The mobile abutment 17 for the inner side of the side trim member 4' shares the movements of the slide 25 and of the holder 18' thereon. The aforementioned microswitch 32 of the means for monitoring the position of the mobile abutment 17 then generates a signal which is used to arrest the servomotor 27' and/or to inform the operator of the hand wheel 27 that the abutment 17 and the sawing machine 19' have been moved to optimum positions for carrying out a miter cutting operation.

The miter cutting operation takes place while the sawing machines 19 and 19' move along the guide members 20, 20' under the action of the respective elevator conveyors 22 and 22' and their tools 23, 23' are driven by discrete motors, not shown. The operation of the elevator conveyors 22, 22' can be initiated by hand or with a desired delay upon actuation of the microswitch 32 by the mobile abutment 17.

It goes without saying that the machines 19 and 19' comprise suitable means for changing the inclination of the planes of the respective tools 23, 23' relative to the portion 5c of the edge face 5 of the panel 3.

The monitoring means including the microswitch 32 can be said to constitute a means for monitoring the distance of the mobile abutment 17 from the abutment 16 for the side trim member 4 and for generating visible, audible and/or other signals when the desired distance has been reached, i.e., when the abutment 17 contacts the side trim member 4' while the abutment 16 is in contact with the side trim member 4. Otherwise stated, the monitoring means including the microswitch 32 measures the distance between the edges 24 and 24' at the corners between the ends of the third portion 5c and the first and second portions 5a, 5b of the edge face 5 on the panel 3.

The third or additional bracket 8" of the clamping device (second supporting means) 7 can be mounted on one or more tie rods 30 for the slide or carriage 25 and can be shifted lengthwise of the tie rods in order to assume an optimum position between the brackets 8 and 8', depending on the length of the third portion 5c of the edge face 5. If the panel which carries the side trim members 4, 4' is relatively small (i.e., if the portion 5c of the edge face 5 is rather short), the additional bracket 8" can be detached in its entirety. The means for separably coupling the bracket 8" to the tie rods 30 is shown schematically at 118. The bracket 8" will be deactivated or detached when the head trim member 6 is sufficiently short or rigid so that it is highly unlikely to undergo deformation while it is being held by the clamping device 7 at two spaced-apart locations, namely between the abutment 11 and the jaw 12 as well as between the abutment 11' and the jaw 12'.

Figure 6:
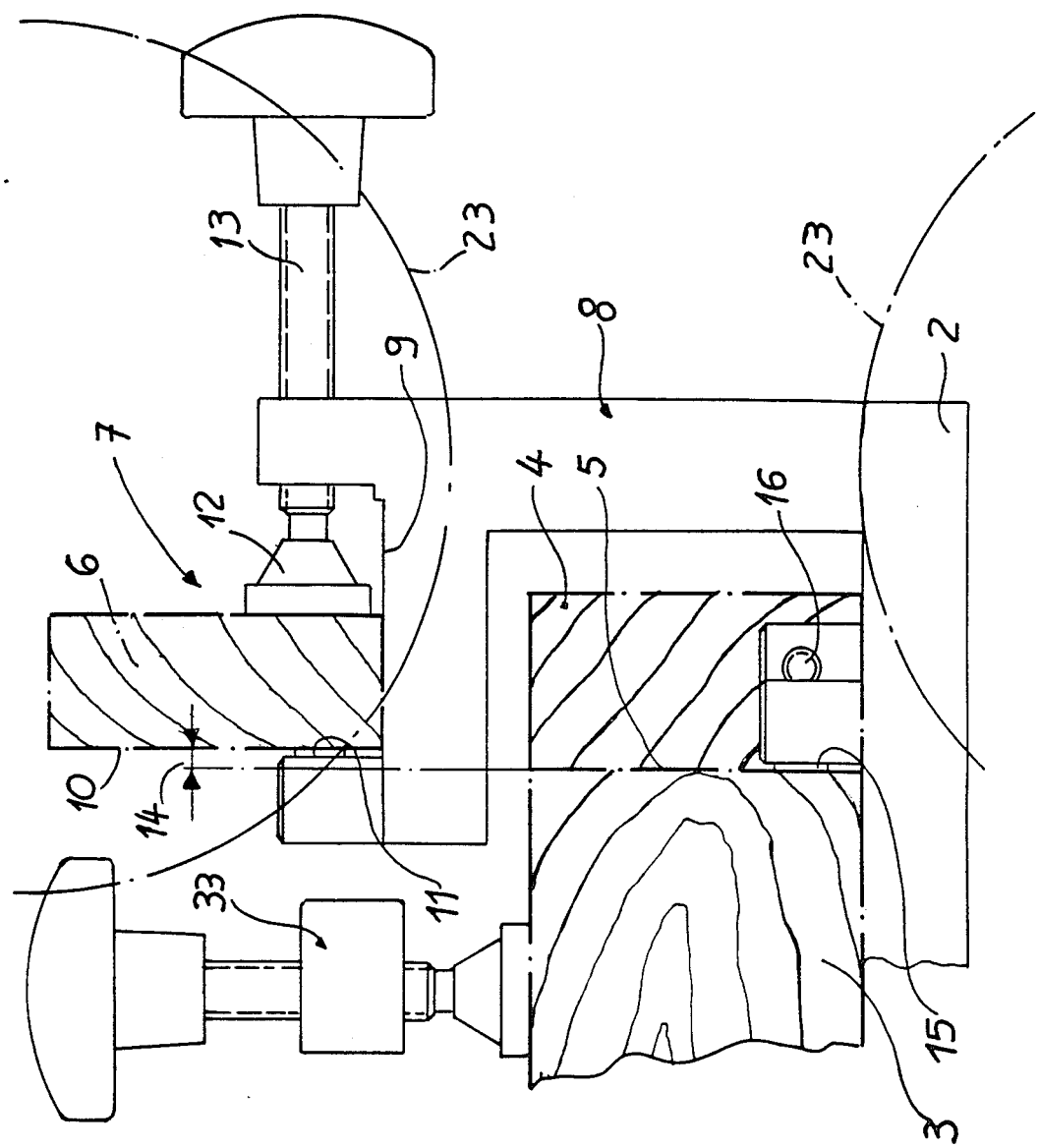
FIG. 6 is an enlarged vertical sectional view of a detail substantially as seen in the direction of arrow VI in FIG. 1.

FIG. 6 shows a further clamping device 33 which is actuated to secure the panel 3 in a selected position when the edge face 5 of the panel contacts the abutments 15 and 15' on the frame 2. The device 33 is designed to clamp the panel 3 to the frame 2. In such clamped position, the panel 3 can be said to form part of the means (2+3) for supporting the side trim members 4 and 4' in optimum positions for severing by the tools 23 and 23'.

The microswitch 32 can be replaced with a limit switch, a mechanical sensor or any other means which can generate or initiate the generation of appropriate signals. The utilization of a microswitch or the like in conjunction with a mobile abutment (17) which has a knife edge movable along the portion 5c the edge face 5 of the panel 3 is especially desirable and advantageous when the panel 3 has a square, rectangular or other polygonal outline. The knife edge of the abutment 17 can cause the microswitch 32 to generate a signal on engagement of the knife edge with the edge 24' and/or on engagement of the knife edge with the inner side of the trim member 4'.

The improved apparatus preferably comprises a large number of identical or similar parts (such as abutments, stops, jaws, carriages, slides, tie rods, platens, slides, motors, cutting tools and the like) in order to reduce the initial cost and to keep to a minimum the number of parts which must be held in storage. The sawing machine 19 is preferably identical with and is mounted in such a way that it is a mirror image of the sawing machine 19'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for cutting miters on adjacent side and head trim members, comprising first supporting means for supporting two mutually inclined side trim members in a first plane; at least one first abutment provided on said supporting means and engageable with one of said side rim members; at least one mobile second abutment engageable with the other of the side trim members; means for moving said second abutment relative to the first abutment along a predetermined path so as to engage a selected portion of the other side trim member; second supporting means for supporting a head trim member in a second plane parallel to and disposed at a level other than said first plane with the head trim member extending across the ends of the side trim members and at predetermined angles thereto, including a plurality of adjustable means for locating the head trim member in a predetermined orientation relative to the side trim members on said first supporting means; first and second sawing machines having mutually inclined plane cutting tools disposed at selected angles to the trim members on said supporting means; conveyor means for moving said machines substantially at right angles to said planes so that each of said tools severs the head trim member and one of the side trim members; and means for adjusting at least one of said machines with reference to said supporting means.

2. The apparatus of claim 1, wherein said first supporting means comprises a table and a panel on said table, said panel having an edge face including spaced-apart mutually inclined first and second portions each adjacent one of the side trim members and a third portion disposed between and inclined relative to the first and second portions and parallel to the head trim member on said second supporting means, said table having at least one third abutment for the edge face of said panel and said second abutment being movable with reference to said table in parallelism with the third portion of said edge face, said adjusting means including means for moving said one machine in parallelism with the path of movement of said second abutment.

3. The apparatus of claim 2, wherein said adjusting means further comprises means for changing the inclination of at least one of said tools relative to the other of said tools, said locating means having means for locating the head trim member on said second supporting means at a distance from the third portion of the edge face of said panel which is a function of the thickness of said plane tools and of the inclination of said tools relative to each other, said first and second portions defining with the third portion of said edge face two edges and said adjusting means being arranged to place each of said tools into register with a different one of said edges.

4. The apparatus of claim 3, further comprising means for generating signals in response to adjustment of said one machine when the respective tool is in register with the corresponding edge of said edge face.

5. The apparatus of claim 4, wherein said signal generating means includes said second abutment and is arranged to generate optical and/or acoustic signals.

6. The apparatus of claim 3, wherein said adjusting means comprises a motor and further comprising means for arresting said motor when one of said tools registers with the corresponding edge.

7. The apparatus of claim 3, further comprising means for generating signals in response to movement of the second abutment into engagement with the selected portion of the other side trim member.

8. The apparatus of claim 7, wherein said signal generating means comprises a microswitch and said second abutment includes a knife edge which is arranged to move along the third portion of the edge face of said panel.

9. The apparatus of claim 3, wherein said adjusting means comprises a carriage for said one machine, guide means supporting said carriage for movement in parallelism with said planes, and drive means including motor means for moving said carriage along said guide means.

10. The apparatus of claim 9, wherein said guide means comprises a plurality of parallel guide members and platens supporting said guide members.

11. The apparatus of claim 9, wherein said drive means includes a rotary feed screw.

12. The apparatus of claim 9, wherein said conveyor means comprises a slide mounted on said carriage and means for moving said slide relative to said carriage along a path extending at right angles to said planes.

13. The apparatus of claim 12, wherein said carriage comprises two elongated guide members and said slide is reciprocable along said guide members.

14. The apparatus of claim 1, wherein said conveyor means comprises a plate-like holder for the other of said machines and a slide movably mounted on said holder and supporting the other machine.

15. The apparatus of claim 1, wherein said locating means comprises at least two stops provided on said second supporting means and a jaw for each of said stops, said jaws being mounted on said second supporting means for movement toward and away from the respective stops so as to clamp the head trim member between them.

16. The apparatus of claim 15, wherein said second supporting means further comprises supporting elements for movably carrying said jaws, said supporting elements having supporting surfaces for the head trim member.

17. The apparatus of claim 15, wherein said locating means comprises at least three stops including first and second stops respectively adjacent the one and the other side trim member and at least one additional stop intermediate the first and second stops.

18. The apparatus of claim 17, further comprising a discrete supporting bracket provided on said second supporting means for each of said stops and the respective jaw.

19. The apparatus of claim 17, further comprising means for separably affixing said additional stop to said adjusting means.

20. The apparatus of claim 1, further comprising signal generating means for monitoring the position of said second abutment and means for operating said adjusting means in response to signals from said monitoring means.

* * * * *